United States Patent
Daehne et al.

[11] 3,867,413
[45] Feb. 18, 1975

[54] FUSIDIC ACID CONJUGATES

[75] Inventors: Welf Von Daehne, Rungsted; Wagn Ole Godtfredsen, Vaerlose, both of Denmark

[73] Assignee: Lee Pharmaceutical Products Ltd. A/S. Lovens Kemiske Fabrik Produktionsaktieselskab, Ballerup, Denmark

[22] Filed: Sept. 24, 1973

[21] Appl. No.: 400,348

[30] Foreign Application Priority Data
Oct. 6, 1972   Great Britain............... 46351/72
Aug. 30, 1973  Great Britain............... 40981/73

[52] U.S. Cl.............................. 260/397.1, 260/999
[51] Int. Cl........................................ C07c 169/60
[58] Field of Search................................ 260/397.1

[56] References Cited
UNITED STATES PATENTS

| | | | |
|---|---|---|---|
| 3,334,014 | 8/1967 | Godtfredsen | 167/65 |
| 3,580,936 | 5/1971 | Patchett et al. | 260/397 |
| 3,622,669 | 11/1971 | Patchett et al. | 424/238 |
| 3,708,510 | 1/1973 | Hannah | 260/397.1 |

*Primary Examiner*—Henry A. French
*Attorney, Agent, or Firm*—Jackson, Jackson & Chovanes

[57] ABSTRACT

The present invention relates to new conjugates of glycine and taurine with compounds of the fusidic acid series according to formulae I and II below, to methods for the preparation of such compounds, and to pharmaceutical compositions thereof. The formulae are

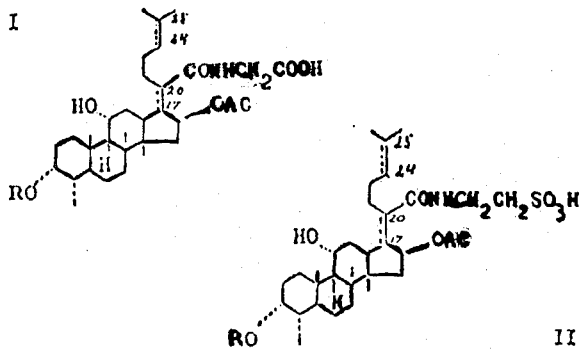

in which OAC indicates OOC.CH₃ the dotted lines between C-17 and C-20 and between C-24 and C-25 indicate that the carbon atoms in question are connected with either a single bond or a double bond, and R is hydrogen or an acetyl group.

The new compounds can be used as artificial "bile salts" in bile salts deficiency states, for the prevention of cholesterol precipitation in bile and for dissolution of cholesterol gallstones in vivo. The new derivatives of fusidic acid have similar micelle-forming properties as the parent compound, but are not antibacterially active and are not metabolized, which are undesirable properties in this context.

6 Claims, No Drawings

FUSIDIC ACID CONJUGATES

The present invention relates to new conjugates of glycine and taurine with compounds of the fusidic acid series according to formulae I and II below, to methods for the preparation of such compounds, and to pharmaceutical compositions thereof.

It is well known that there is a great need for some type of artificial "bile salt" for possible use in bile salt deficiency states, for the prevention of cholesterol precipitation in bile and for dissolution of cholesterol gallstones in vivo. It has recently been demonstrated that sodium fusidate is similar to the bile salts with respect to ability of forming mixed micelles with lecithin and cholesterol and thus is potentially useful as an artificial bile salt.

However, the antimicrobial properties of fusidic acid are undesirable in this context, and it is also a disadvantage that the major part of the fusidic acid is excreted in the bile in a metabolized form. Therefore, it would be desirable to construct derivatives of fusidic acid with similar micelle-forming properties as the parent compound which are not antibacterially active and which are not metabolized. It would also be advantageous, if such derivatives have a lower $pK_a$ value than fusidic acid. The present invention relates to new compounds having these properties.

More particularly the invention comprises conjugates of fusidic acid, 24,25-dihydrofusidic acid, and 17,20-24,25-tetrahydrofusidic acid with glycine or taurine, and their corresponding 3-acetates, methods for the preparation of these new compounds and pharmaceutical compositions containing the new compounds.

The new compounds are represented by the following formulae:

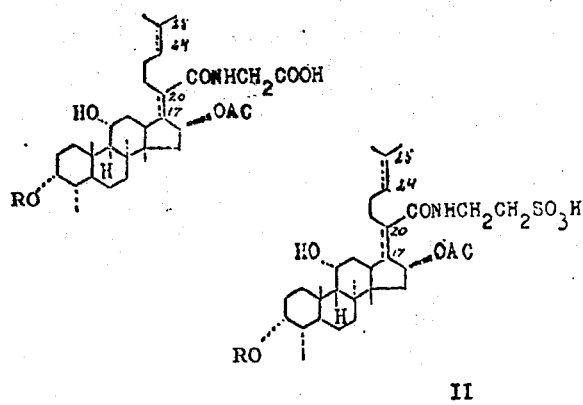

in which OAc indicates $OOC.CH_3$ the dotted lines between C-17 and C-20 and between C-24 and C-25 indicate that the carbon atoms in question are connected with either a single bond or a double bond, and R is hydrogen or an acetyl group.

The compounds can be used as such or in the form of suitable salts with pharmaceutically acceptable bases, for example alkali metal salts, alkaline earth metal salts, the ammonium salt, or amine salts formed, e.g., from mono-, di-, or trialkylamines, or mono-, di-, or trialkanolamines, or cyclic amines.

The compounds of formulae I and II can be prepared by reacting a fusidic acid derivative of formula III with a suitable salt of glycine or taurine, respectively, in an inert solvent such as dimethylformamide, tetrahydrofuran or the like.

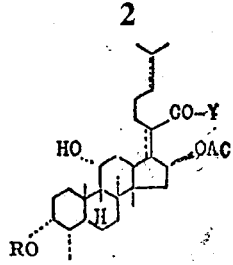

In the formula III R is hydrogen or an acetyl group and the term -CO-Y defines a radical capable of reacting with the amino group of the amino acids taurine and glycine. The radical -CO-Y can, e.g., be the radical of an anhydride, a mixed anhydride, an acid halide or a radical obtained by reacting the free acid with a carbodiimide, or N,N'-carbonyldiimidazole or a similarly functioning compound.

The compounds of formula III can be prepared from the well-known fusidic acid, its 24,25-dihydro and 17,20-24,25-tetrahydro derivatives, or the 3-acetates of these compounds by methods described in the literature for the preparation of reactive derivatives of acids. Most of the compounds of formula III are known compounds and new compounds can be made in a manner similar to the known.

The dihydro- and tetrahydro- compounds of the invention can also be obtained by a catalytic hydrogenation of the corresponding unsaturated compounds of formula I or II.

The 3-acetates of the compounds according to the invention can also be obtained by acetylation of the corresponding non-acetylated compounds.

The compounds of the invention are well tolerated compounds which can preferably be administered orally either as such, or in the form of one of their salts, and may be mixed up with a solid carrier and/or auxiliary agents. Such pharmaceutical composition can contain conventional organic or inorganic inert carrier material, such as water, gelatine, lactose, starch, magnesium stearate, talc, vegetable or animal fats or oils, gums, polyalkylene glycols, or other known carriers for medicaments for human use.

The pharmaceutical composition can be in conventional solid or liquid dosage form, such as tablets, capsules, dragees, solutions, suspensions, or emulsions.

The pharmaceutical composition can also contain pharmaceutical additives, such as stabilizing, wetting, or emulsifying agents and buffers. Furthermore the compositions may contain other pharmaceutically active components which can appropriately be administered together with the compounds of the invention in the treatments of the above-mentioned disorders of the bile.

The compounds can be administered to human beings in dosages of from 0.5 g to 5 g per day. The doses can be given in a single dosage form but preferably in divided dosage units containing from 0.1 g to 1 g of the active ingredient. By the term "dosage unit" is meant a unitary, i.e., a single dose capable of being administered to a patient, and which may be readily handled and packed, remaining as a physically stable unit dose, comprising either the active material as such or a mixture of it with a pharmaceutical carrier.

In the form of a dosage unit the compound can be administered once or more times a day, depending on the condition of the patient and the doctor's prescription.

The invention will be further described in the following Examples which are not to be construed as limiting the invention.

EXAMPLE 1

Sodium taurofusidate

To a suspension of taurine (25 g) in dimethylformamide (400 ml) was added triethylamine (28 ml) and, after stirring for 30 minutes at room temperature, fusidic anhydride (51.6 g). After stirring for 70 hours at room temperature, the mixture was diluted with ethyl acetate (1.2 l), water (400 ml) was added, and the pH-value of the aqueous phase was adjusted to 2 addition of 4 N hydrochloric acid with stirring. The aqueous layer was separated, the organic phase was washed with water (3 × 200 ml), dried, and evaporated in vacuo to yield a semicrystalline residue. In addition to a minor amount of fusidic anhydride, this residue consisted mainly of fusidic acid as revealed by thinlayer chromatography (solvent system methylene chloride: methanol 9:1; spray reagent: sulphuric acid, 98 percent). To the combined aqueous phase and washings (about 1.6 l) was added sodium chloride (60 g) and n-butanol (400 ml), and the mixture was shaken vigorously. The organic layer was separated and the aqueous phase reextracted with n-butanol (2 × 200 ml). The combined n-butanol extracts were washed with saturated aqueous sodium chloride (3 × 100 ml), filtered, and concentrated to a volume of about 200 ml at reduced pressure. A crystalline precipitate of sodium chloride which had formed was filtered off, and the filtrate was evaporated to dryness in vacuo to give a viscous oil. The oily residue was dissolved in methanol (200 ml), and the pH-value of the solution was adjusted to 10.8 by addition of 5 N aqueous sodium hydroxide with stirring. The mixture was evaporated to dryness in vacuo, the resulting residue was redissolved in 99 percent ethanol (150 ml) and filtered through dicalite to remove insoluble sodium chloride. The filtrate was again evaporated in vacuo to yield a yellowish oil. This residue was dissolved in methanol (35 ml), water (3.5 ml) was added, and crystallization of colourless material occurred upon scratching. After being kept in the refrigerator overnight, the mixture was diluted with ice-cold acetone (140 ml), the crystals were filtered off, washed with acetone, and dried to afford sodium taurofusidate, m.p. 220°–222°C. Concentration of the mother liquor at reduced pressure gave a second crop of the desired product, m.p. 216°–218°C. The two crops of crystalline sodium taurofusidate were recrystallized from methanolacetone to give the pure compound, m.p. 224°–226°C, $[\alpha]_D^{20} - 11°$ (c = 0.5 in methanol). Found= C 55.64; H 8.35; N 2.03; S 4.52; $H_2O$ 8.56 percent $C_{33}H_{52}NO_8SNa$, 3.5 $H_2O$ requires: C 55.91; H 8.39; N 1.98; S 4.52; $H_2O$ 8.90 percent.

EXAMPLE 2

Sodium tauro-24,25-dihydrofusidate

To a solution of sodium taurofusidate (3.54 g) in 96 percent ethanol (50 ml) was added 5 percent palladium on barium sulphate catalyst (0.7 g), and the mixture was shaken in a hydrogen atmosphere for 3.5 hours. The catalyst was filtered off, washed with 96 percent ethanol, and the filtrate evaporated to dryness. To a solution of the residue in 96 percent ethanol (4.6 ml) was added water (0.4 ml), followed by acetone (30 ml), and upon scratching crystallization began. After stirring for 1 hour at room temperature, the mixture was diluted with acetone (25 ml) and kept in the refrigerator overnight. The crystals were filtered off, washed with acetone, and dried to give sodium tauro-24,25-dihydrofusidate, m.p. 198°–202°C, $[\alpha]_D^{20} - 14°$ (c = 0.5 in methanol). Found: C 56.70; H 8.43; N 1.99; S 4.63; $H_2O$ 7.92 percent $C_{33}H_{54}NO_8SNa$, 3 $H_2O$ requires: C 56.47; H 8.62; N 2.00; S 4.57; $H_2O$ 7.92 percent. Concentration of the mother liquor at reduced pressure afforded a second crop of the desired compound, m.p. 194°–200°C.

EXAMPLE 3

Glycofusidic acid

To a suspension of glycine (15 g) in dimethylformamide (400 ml) was added triethylamine (28 ml) and, after stirring for 30 minutes at room temperature, fusidic anhydride (51.6 g). After stirring for 70 hours at room temperature, the mixture was diluted with ethyl acetate (1.2 l), water (400 ml) was added, and the pH-value of the aqueous phase was adjusted to 2 by addition of 4 N hydrochloric acid with stirring. The organic phase was separated, washed with water (3 × 200 ml) and concentrated at reduced pressure to a volume of about 250 ml. To the concentrate was added water (200 ml), and the pH-value of the aqueous phase was adjusted to 7.5 by addition of saturated aqueous sodium bicarbonate with stirring. The aqueous phase was separated and the organic phase washed with water (2 × 100 ml), dried, and evaporated in vacuo to yield a semicrystalline product which, according to thinlayer chromatography (see Example 1) consisted of a mixture of fusidic acid and fusidic anhydride.

To the combined aqueous phase and washings was added ethyl acetate (400 ml), and the pH-value of the aqueous phase was adjusted to 2 by addition of 4 N hydrochloric acid with stirring. The organic phase was separated, and the aqueous phase reextracted with ethyl acetate (200 ml). The combined organic extracts were washed with water (2 × 50 ml), dried and concentrated at reduced pressure to a volume of about 100 ml. The crystalline material which had precipitated was filtered off, washed with ethyl acetate, and dried to afford glycofusidic acid, m.p. 234°–236°C. Further concentration of the mother liquor gave a second crop of the desired compound, m.p. 228°–230°C. Recrystallization from methanol-ethyl acetate gave the analytical sample, m.p. 236°–238°C; $[\alpha]_D^{20} - 21°$ (c = 0.5 in methanol). Found: C 68.91; H 9.04; N 2.51 percent. Calcd. for $C_{33}H_{51}NO_7$: C 69.08; H 8.96; N 2.44 percent.

EXAMPLE 4

Glyco-24,25-dihydrofusidic acid

To a solution of glycofusidic acid (3.44 g) in 96 percent ethanol (70 ml) was added 5 percent palladium on barium sulphate catalyst (0.7 g), and the mixture was shaken in a hydrogen atmosphere for 2.5 hours. The catalyst was filtered off, washed with 96 percent ethanol, and the filtrate evaporated to dryness. The residue crystallized from ethyl acetate to yield the desired compound, m.p. 215°–217°C. Recrystallization from methanol-ethyl acetate raised the m.p. to 219°–220°C, $[\alpha]_D^{20} - 27°$ (c = 0.5 in methanol). Found: C 68.57; H 9.23; N 2.39 percent. Calcd. for $C_{33}H_{53}NO_7$: C 68.84; H 9.28; N 2.43 percent.

EXAMPLE 5

Glyco-17,20-24,25-tetrahydrofusidic acid

To a solution of glycofusidic acid (2.87 g) in 96 percent ethanol (50 ml) was added platinum oxide (0.3 g), and the mixture was shaken in a hydrogen atmosphere for one hour. The catalyst was filtered off, washed with 96 percent ethanol, and the filtrate was evaporated to dryness in vacuo. The amorphous residue was dissolved in methanol (15 ml), ethyl acetate (60 ml) was added, and the mixture was concentrated to about 15 ml at reduced pressure. Upon scratching, the desired compound crystallized. The crystalline precipitate was filtered off, washed with ethyl acetate, and dried to give glyco-17,20-24,25-tetrahydrofusidic acid, m.p. 205°–209°C. Two recrystallizations from methanol-ethyl acetate raised the m.p. to 213°–215°C, $[\alpha]_D^{20}$ − 29° (c = 0.5 in methanol). Found: C 68.37; H 9.58; N 2.43 percent. Calcd. for $C_{33}H_{55}NO_7$: C 68.60; H 9.59; N 2.42 percent.

EXAMPLE 6

Sodium tauro-17,20-24,25-tetrahydrofusidate

A solution of sodium taurofusidate (7.0 g) in 96 percent ethanol (100 ml) was shaken at room temperature under one atmosphere hydrogen in the presence of platinum oxide (0.7 g). In 90 minutes, 500 ml of hydrogen were absorbed and the consumption of hydrogen ceased. The catalyst was removed by filtration, and the filtrate was evaporated to dryness in vacuo. Crystallization of the residue from methanol-acetone afforded the desired compound.

EXAMPLE 7

3-Acetyl glyco-24,25-dihydrofusidic acid

Glyco-24,25-dihydrofusidic acid (2.88 g) was dissolved in a mixture of acetic anhydride (3 ml) and pyridine (3 ml). After standing for 1.5 hours at room temperature, water (60 ml) was added, and the mixture was extracted with ethyl acetate (3 × 30 ml). The combined organic extracts were washed with diluted aqueous hydrochloric acid to remove pyridine, followed by water until neutral. The organic layer was dried and evaporated in vacuo to leave a residue from which the desired compound could be obtained by purification by column chromatography on silica gel.

EXAMPLE 8

Taurine conjugates of 24,25-dihydro- and 17,20-24,25-tetrahydrofusidic acids as their sodium salts Following the procedure described in Example 1, but substituting for the fusidic anhydride the 24,25-dihydrofusidic anhydride or the 17,20-24,25-tetrahydrofusidic anhydride, the desired compounds were obtained with the same melting points and physical data as described in the Examples 2 and 6.

EXAMPLE 9

Glycine conjugates of 24,25-dihydro- and 17,20-24,25-tetrahydrofusidic acids

Following the procedure described in Example 3, but substituting for the fusidic anhydride the 24,25-dihydrofusidic anhydride or the 17,20-24,25-tetrahydrofusidic anhydride, the desired compounds were obtained with the same melting points and physical data as described in the Examples 4 and 5.

EXAMPLE 10

Sodium 3-acetyltaurofusidate

3-Acetylfusidic anhydride (11 g) was added to a stirred suspension of taurine (2.5 g) and triethylamine (2.8 ml) in a mixture of dimethylformamide (40 ml) and hexamethylphosphoric triamide (40 ml). After stirring for 72 hours at room temperature, ethylacetate (240 ml) and water (80 ml) were added, and the pH-value of the mixture was adjusted to 2 by addition of 4 N hydrochloric acid with stirring. The aqueous phase was separated, the organic phase was washed with water (3 × 40 ml), dried and evaporated in vacuo to give a semicrystalline residue which according to TLC[+], consisted mainly of 3-acetylfusidic acid. Sodium chloride (20 g) and n-butanol (150 ml) was added to the aqueous phase, and the mixture was shaken vigorously. The organic layer was separated and the aqueous phase reextracted with n-butanol (2 × 75 ml). The combined n-butanol extracts were thoroughly washed with water, [+]TLC stands for Thin Layer Chromatography. filtered, and evaporated to dryness in vacuo. The oily residue was dissolved in methanol (40 ml), insoluble salt was filtered off, and the pH-value of the filtrate was adjusted to 10.8 by addition of 5 N aqueous sodium hydroxide with stirring. The mixture was evaporated to dryness at reduced pressure to afford a yellowish oil. This residue was dissolved in methanol (5 ml), acetone (75 ml) was added, and from the solution thus obtained colourless crystals of the desired compound precipitated upon scratching, were filtered off, washed with acetone, and dried.

EXAMPLE 11

Sodium glycofusidate

A solution of glycofusidic acid (574 mg) in methanol (5 ml) was carefully neutralized with 2 N sodium hydroxide (phenolphthalein indicator), and the mixture evaporated in vacuo. The resulting amorphous residue was dissolved in methanol (0.5 ml), acetone (5 ml) was added, and crystallization was induced on scratching. After standing for one hour at room temperature, further acetone (5 ml) was added, and the crystals were filtered off, washed with acetone, and dried to afford the desired compound.

EXAMPLE 12

Sodium glyco-24,25-dihydrofusidate

Following the procedure described in Example 11, but substituting for the glycofusidic acid the glyco-24,25-dihydrofusidic acid, the desired compound was obtained.

EXAMPLE 13

Diethanolammonium glycofusidate

To a stirred solution of glycofusidic acid (287 mg) in methanol (3 ml) was added a 0.5 M solution of diethanolamine in acetone (1 ml), and the mixture was evaporated in vacuo. The oily residue was dissolved in acetone (5 ml), and upon scratching a crystalline product precipitated. The crystals were collected by filtration, washed with acetone, and dried to give the desired compound, m.p. 179°–180°C. Found: C 65.00, H 9.14, N 4.10 percent. Calcd. for $C_{37}H_{62}N_2O_9$, 0.5 $H_2O$: C 64.60, H 9.23, N 4.07 percent.

EXAMPLE 14

Diethanolammonium glyco-24,25-dihydrofusidate

Following the procedure described in Example 13, but substituting for the glycofusidic acid the glyco-24,25-dihydrofusidic acid, the desired compound, m.p. 165°–166°C, was obtained. Found: C 64.46, H 9.46, N 4.05 percent. Calcd for $C_{37}H_{64}N_2O_9$, 0.5 $H_2O$: C 64.41, H 9.50, N 4.06 percent.

EXAMPLE 15

Dicyclohexylammonium glycofusidate

Dicyclohexylamine (0.1 ml) was added to a solution of glycofusidic acid (287 mg) in methanol (3 ml), and the mixture was evaporated at reduced pressure. From the solution of the residue in acetone (5 ml) a crystalline product precipitated on scratching. The crystals were filtered off, washed with acetone and dried to give the desired product, m.p. 163°–164°C. Found: C 70.06, H 9.86, N 3.53 percent. Calcd. for $C_{45}H_{74}N_2O_7$, $H_2O$: C 69.91, H 9.91, N 3.62 percent.

EXAMPLE 16

Dicyclohexylammonium glyco-24,25-dihydrofusidate

Dicyclohexylamine (0.1 ml) was added at 35°C to a stirred solution of glyco-24,25-dihydrofusidic acid (288 mg) in acetone (10 ml). The crystalline product which had precipitated was filtered off, washed with acetone, and dried to afford the desired compound, m.p. 175°–176°C. Found: C 70.00, H 10.09, N 3.46 percent. Calcd for $C_{45}H_{76}N_2O_7$, $H_2O$: C 69.73, H 10.14, N 3.61 percent.

What we claim is:

1. Compounds represented by the following formulae:

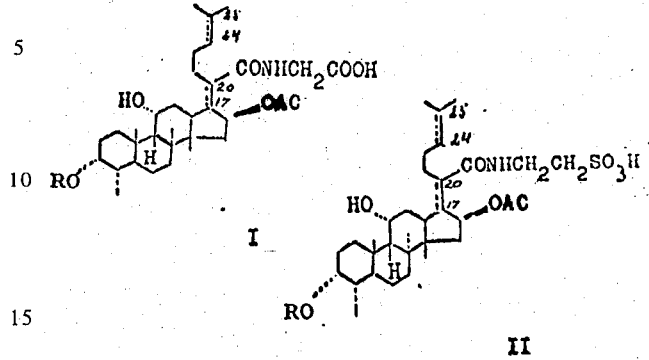

in which OAc indicates $OOC.CH_3$ the dotted lines between C-17 and C-20 and between C-24 and C-25 indicate that the carbon atoms in question are connected with either a single bond or a double bond, and R is hydrogen or an acetyl group, and their salts with pharmaceutically acceptable bases.

2. The conjugates of fusidic acid, 24,25-dihydrofusidic acid and 17,20-24,25-tetrahydrofusidic acid with glycine and pharmaceutically acceptable salts thereof.

3. The conjugates of fusidic acid, 24,25-dihydrofusidic acid and 17,20-24,25-tetrahydrofusidic acid with taurine and pharmaceutically acceptable salts thereof.

4. Sodium taurofusidate.
5. Sodium tauro-24,25-dihydrofusidate.
6. Sodium tauro-17,20-24,25-tetrahydrofusidate.

* * * * *

UNITED STATES PATENT OFFICE
CERTIFICATE OF CORRECTION

Patent No. 3,867,413　　　　　　　　Dated February 18, 1975

Inventor(s) Welf Von Daehne, Wagn Ole Godtfredsen

It is certified that error appears in the above-identified patent and that said Letters Patent are hereby corrected as shown below:

In the formulae in the Abstract and in the specification at column 1, lines 40 and 45 and column column 2, line 5, and column 8, lines 7 and 11, "OAC" should read - OAc - .

In the Abstract, line immediately following formulae, "OAC" should read - OAc -.

Signed and sealed this 17th day of June 1975.

(SEAL)
Attest:

RUTH C. MASON
Attesting Officer

C. MARSHALL DANN
Commissioner of Patents
and Trademarks